Aug. 14, 1945.    L. A. WHITNEY ET AL    2,382,928
THERMAL MOTOR
Filed April 4, 1940    2 Sheets-Sheet 1

INVENTORS
LEWIS A. WHITNEY
AUSTIN C. KIDDER
BY
John F. Hanrahan
ATTORNEY

Aug. 14, 1945.   L. A. WHITNEY ET AL   2,382,928
THERMAL MOTOR
Filed April 4, 1940   2 Sheets-Sheet 2

INVENTORS
LEWIS A. WHITNEY
AUSTIN C. KIDDER
BY
John H. Hanrahan
ATTORNEY

Patented Aug. 14, 1945

2,382,928

UNITED STATES PATENT OFFICE 2,382,928

THERMAL MOTOR

Lewis A. Whitney, Stratford, and Austin C. Kidder, Bridgeport, Conn.

Application April 4, 1940, Serial No. 327,926

11 Claims. (Cl. 60—23)

This invention relates to new and useful improvements in means or devices for imparting motion and has particular relation to such a means including a thermostatic element through which motion is imparted on the application of heat.

An object of the invention is to provide a thermotor as indicated and which is reliable in operation and yet of simple and inexpensive construction whereby it is adapted for general use to impart motion as for use in advertising display work, advertising novelties, toys and the like.

Other objects and advantages will become apparent from a consideration of the following detailed description taken in connection with the accompanying drawings wherein satisfactory embodiments and applications of the invention are shown. However, it is to be understood that the invention is not limited to the details disclosed but includes all such variations and modifications as fall within the spirit of the invention and the scope of the appended claims.

In the drawings:

Fig. 5 is a view similar to Fig. 1 but showing yet another modification;

Figure 1:
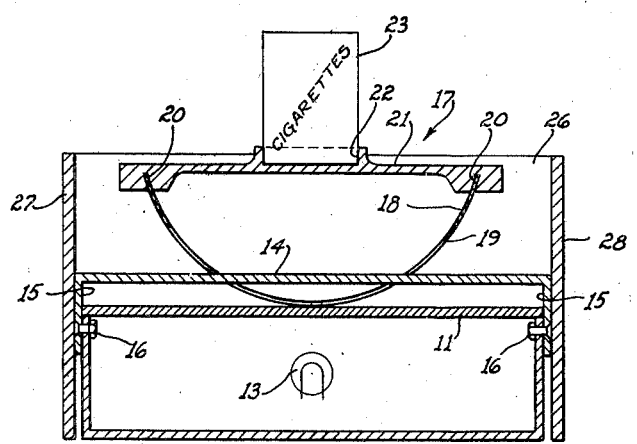
Fig. 1 is a longitudinal sectional view showing a construction involving the principles of the invention.
Figure 2:
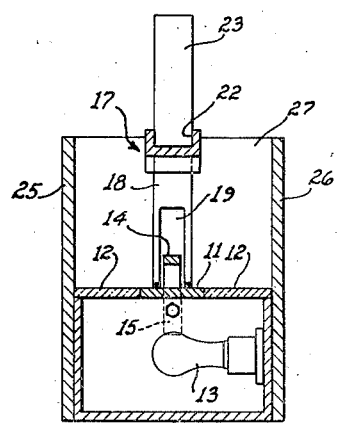
Fig. 2 is a transverse sectional view through the device of Fig. 1.

Referring in detail to the drawings and at first more particularly to Figs. 1 and 2 at 10 is generally indicated a base or support in the form of a box-like structure the top wall of which comprises a central strip 11 of metal or the like and similar or substantially similar pieces of glass 12 at the edges of said central metal strip. Within the base 10 is an incandescent lamp 13 which serves as a heat source and also as a source of illumination as will more fully appear.

A guiderail 14 is disposed over the upper or top side of the base 10 and in vertically spaced relation to but aligned with the metal strip 11. This guiderail may be supported in any suitable manner. One method shown includes downturned end portions 15 secured to the end walls of the base by bolts 16.

17 generally indicates a thermotor or motion imparting means and the same includes a bimetallic strip 18 having a slot 19 extending longitudinally thereof. Strip 18 is bent and held in the form of an arc or in curved formation by having its end portions inserted into the slots 20 provided in the end portions of a connecting bar 21 which may be of wood or of a molded material but is shown in the form of a casting of some lightweight metal. This bar is rigid and equidistant from its respective ends, is provided with a pocket, recess, or other means 22 adapted to receiving an article to be displayed. As here shown a pocket is receiving a cigarette package 23.

The slotted or bifurcated portion of the strip 18 straddles or receives the guidebar 14 whereby normally the parts are positioned as shown in the drawings with the midportion of the thermostatic strip in connection with the metal portion 11 of the top surface of the base. With this arrangement it is noted that the heat from the lamp 13 is more directly concentrated on the metal strip 11 so that the glass or other transparent or semi-transparent means 12 is not likely to be broken or deformed due to excessive unequal heating but yet will transmit light to illuminate the means 17 and also any article 23 carried thereby. As the strip 11 becomes heated the thermostatic element 18 is affected and starts a slight rocking movement.

As the heating increases the rocking movement becomes more pronounced and finally the strip 18 and parts carried thereby rock rather violently back and forth. This occurs without any great amount of heat and the only heat necessary for the purpose is such as may be derived from the lamp 13. The guide 14 being located in the slot 19 of the element 18 the latter is held against lateral tipping movement thereby preventing it from falling over and maintaining its motion through a fixed plane. Also the bridge limits the extent of throw of the rocking movement since the ends of the slot 19 or the solid portions of the strip at the ends of such slots as they engage the guide alternately, prevent further rocking movement in each direction. If this abrupt stoppage is not desired the slot 19 is made longer and where a more rapid back and forth motion is desired, the slot is made shorter.

As shown in Figs. 1 and 2 the device comprises an advertising novelty and will attract considerable attention since the article displayed, for example the cigarettes 23, are being moved. The same means which supplies the heat and causes this movement supplies light for illuminating the displayed goods. If desired a shield may be disposed about the base 10 and the means 17 so as to conceal the same from observation and as shown here such shield includes front and rear walls 25 and 26 and end walls 27 and 28 although it will be apparent that other covering means may be used.

The shield means including the walls described may be attached to the base or not as desired and may, of course, carry any designs or advertising statements or the like. As the rocking motion is imparted to the article 23 solely by heat and without the aid of any apparent source of power the display has an added interest due to an element of mystery resulting from the apparent lack of a source of power. The means involves no parts to get out of order or become disarranged or in other ways to cause trouble and thus the device may be left to operate on any display counter or the like and requires no special attention to insure its continuous and proper functioning.

Figure 3:
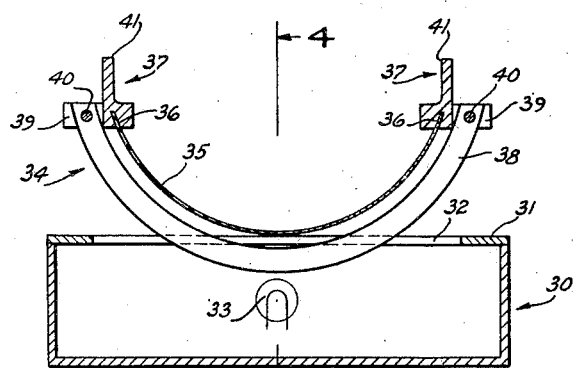
Fig. 3 is a view similar to Fig. 1 but showing a modification.
Figure 4:
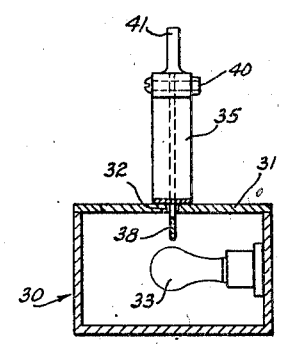
Fig. 4 is a transverse sectional view taken along the line 4—4 of Fig. 3.

Referring now to Figs. 3 and 4 the modification there illustrated includes a base 30 the top wall 31 of which is provided with a longitudinally extending slot 32. Within the base is any source of heat as for example the lamp 33. Disposed on the base is a motion imparting means comprising a bowed or curved bimetallic thermostatic strip 35. Strip 35 has its end portions received in slots 36 in a pair of similar spaced castings 37. An arcuate metal strip 38 which may be of aluminum or the like has its ends received in slots 39 in said castings and secured therein as by bolts 40. Thus strip 38 is secured to the castings 37 and maintains them in the desired spaced relation retaining the thermostatic strip 35 in curved condition.

Strip 38 is spaced from strip 35 so as not to interfere with flexing of the latter and extends through the slot 32 in the top wall 31 of base 30. Castings 37 may include upstanding lugs 41 to which may be secured articles or devices to be moved. With the arrangement shown the strip 38 being passed through the slot 32 the thermostatic strip 35 rests on the top surface of wall 31. Thus, as said surface becomes heated the means 34 will rock back and forth in the manner above described with reference to the means 17.

Strip 38 in addition to maintaining the castings 37 in the desired relation and thus maintaining the strip 35 bowed serves also by reason of its location in slot 32 to guide and control the rocking movement of means 34. Thus the strip prevents lateral tipping of such means and also on engagement with the ends of slot 32 limits abruptly the extent of the back and forth rocking movement of the means, if desired.

Figure 5:
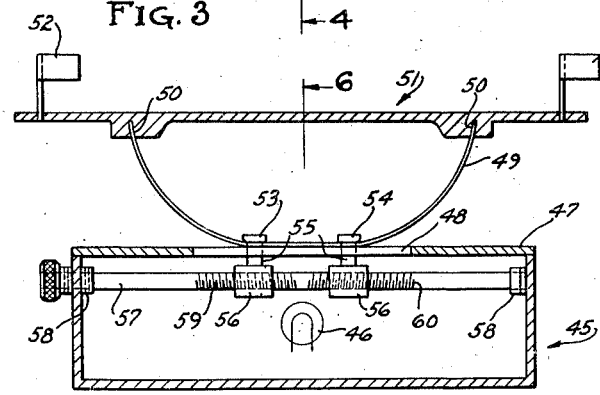
Fig. 5 is a view similar to Fig. 1 but showing a modification.
Figure 6:
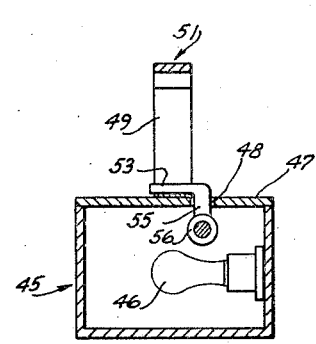
Fig. 6 is a sectional view taken as along the line 6—6 of Fig. 5.

Referring now to Figs. 5 and 6 at 45 is shown a base within which is located a lamp or other source of heat 46 and the top metal wall 47 of which is provided with a slot 48. Resting on the wall 47 to one side of slot 48 is a curved bimetallic thermostatic element 49 having its ends received in slots 50 of a rigid bar 51 which may be a casting or the like. Obviously, the bar serves to retain the thermostrip 49 in its curved formation with its ends in the desired relation. Such bar may extend beyond the ends of the strip 49 as shown and may carry any means 52 for display.

In this form of the invention there is included, as with the forms previously described, means for guiding and limiting the movement imparted by the thermostatic element on the latter being influenced by heat. Here the means includes a pair of fingers 53 and 54 disposed against the inner surface of the strip 49 and including portions 55 passing through the slot 48 and at their lower ends carrying threaded portions 56. Passing through the portions 56 of both the fingers is a bar 57 having bearing at 58 in spaced portions of the base and having right and left hand threaded portions 59 and 60 threaded respectively into the portions 56 of the fingers 53 and 54.

With this arrangement the fingers are held down against the upper intermediate surface portion of the strip 49 thus holding it against the wall 47 and preventing lateral tipping. As such wall is heated the element 49 will rock in the manner described above in connection with the corresponding portion of Fig. 1. Obviously, by turning the bar 57 in one direction or the other, fingers 53 and 54 are moved toward or from one another. When these fingers are close together centrally of the strip 49 the heat will cause rocking movement of the strip of considerable magnitude.

As the fingers are moved into spaced relation, for example as shown in Fig. 5, the amplitude of the rocking movement of the strip 49 is decreased, but the rapidity of motion of the strip is very materially increased. From this it will be noted that when means are provided reducing the amplitude of movement the rapidity or rate of movement is increased while when the amplitude is permitted to increase the rate decreases.

This last is true of all forms of the invention and the rate of movement of the means 17 may be increased and the amplitude decreased without changing the heat available simply by having a shorter slot 19 or by raising the guide 14. Somewhat similarly as the slot 32 of Fig. 3 is reduced the amplitude of movement of means 34 will be reduced but the rate of such movement will increase.

Figure 7:
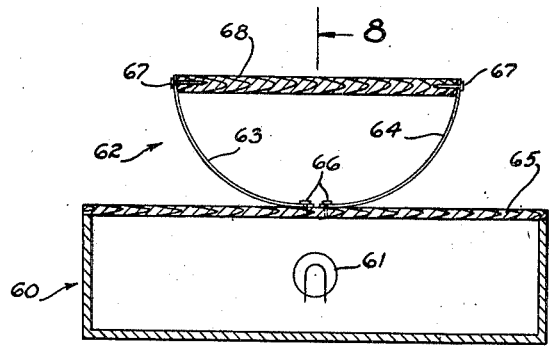
Figure 8:
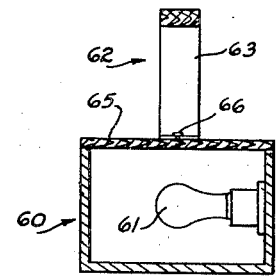
Fig. 8 is a sectional view taken along the line 8—8 of Fig. 7.

Referring now to Figs. 7 and 8 a base is generally indicated 60 and within the same is mounted a heat source 61 in the form of a bulb. On the base is a motion imparting means 62 comprising a multi-part bimetallic thermal element including two shorter strips of thermostatic metal 63 and 64 having their adjacent ends fastened to the top wall 65 of the base by tacks, rivets or the like 66. The outer ends of the strips 63 and 64 are secured by tacks or any other suitable means 67 to the ends of a connecting bar 68 of wood or the like. Bar 68 may support any means or device which is desired to display.

In this construction as the wall 65 becomes heated the device 62 will rock back and forth in the same manner as the devices previously described. The amplitude and rate of such rocking motion will depend on the relation to one another of the tacked adjacent ends of the two sections of the thermostatic strip.

Figure 9:
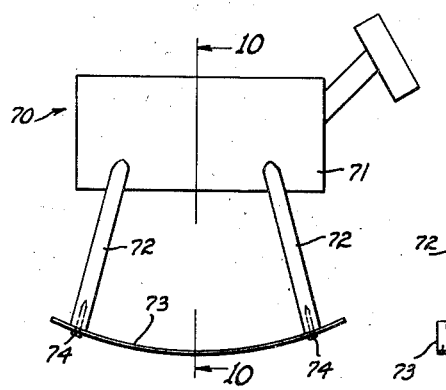
Fig. 9 is a side elevational view showing a rocking toy made in accordance with the invention.
Figure 10:
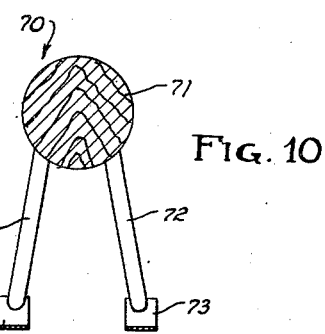
Fig. 10 is a sectional view taken along the line 10—10 of Fig. 9.

Figs. 9 and 10 show a toy 70 made in accordance with the invention and the same comprises a body 71 and four legs 72 arranged in pairs at each side of the body. A pair of curved bimetallic thermostatic strips 73 are utilized and one strip is secured to the lower ends of each pair of legs as by means of tacks or the like 74. With this arrangement a rocker-like construction is provided as a base for the toy 70 and when the toy is placed on a heated surface it will rock back and forth. One feature to be noted about this construction is that the rocking movement will not extend beyond the points where the thermostatic strips or rockers are rigidly secured to the legs 72. Thus depending on the spacing of the legs of each pair the amplitude and rate of the rocking movement may be predetermined.

Figure 11:
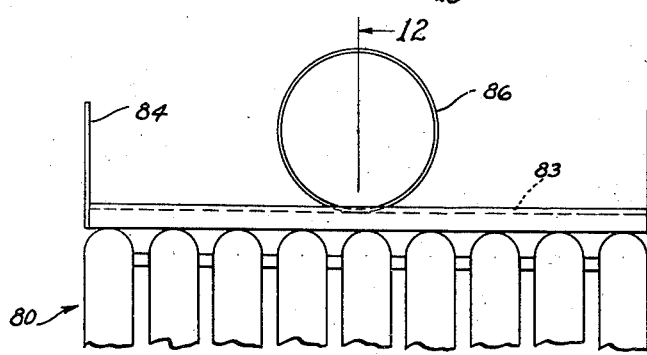
Fig. 11 is an elevational view showing a further modification.
Figure 12:
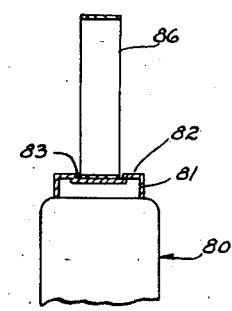
Fig. 12 is a sectional view taken as along the line 12—12 of Fig. 11.

In modifications of Figs. 11 and 12 a heating radiator is illustrated as the source of heat, a portion only of such a radiator being shown and generally designated 80. On the upper side of this radiator is a base means 81 comprising an elongated device formed of sheet metal and provided in its upper wall 82 with a depression or longitudinally extending groove or recess 83. At the respective ends of such groove or recess are walls or stops 84 and 85. In this modification a hoop 86 is formed of bimetallic thermostatic metal and the width of the groove 83 is such as to receive this hoop although not snugly.

With this arrangement as base 81 is heated the hoop will roll along the groove 83 until it hits one of the stops 84 or 85 and then as the direction of the movement is reversed it rolls until it hits the other stop. This movement will continue as long as the heat is applied. The groove 83 guides the movement of the hoop and lends the necessary support to prevent it from turning over and obviously the depth of this groove and its length may be as desired for any particular application. The ends of the strip forming the hoop may be butt welded or the like.

Figure 13:
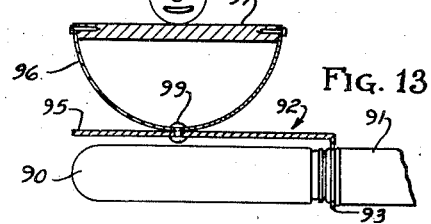
Fig. 13 is a view similar to Fig. 1 and showing a further modification.
Figure 14:
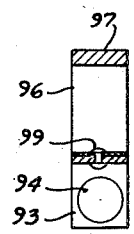
Fig. 14 is a transverse sectional view of the means of Fig. 13 but with the lamp omitted.

Referring now to the modification of Figs. 13 and 14 at 90 is shown a lamp of the type known as a show case lamp and the same is threaded into a socket 91 of any or the usual construction. An L-shaped bracket 92 of metal or the like has an arm 93 perforated at 94 for threading onto the socket 91 although it may simply have a tight fit about the socket. Riveted on the upper side of the arm 95 of bracket 92 is a curved piece of bimetallic thermostatic material 96 having its ends connected by a bar 97 which, as shown is supporting any means to be displayed as the figure 98.

Obviously the rivet 99 secures the element 96 against excessive movement and forms the same into a unit with the bracket 92 whereby the assembly may be easily and quickly applied to the socket 91 with the element over the lamp 90. Since bracket arm 95 is but a relatively narrow piece of metal it is apparent that while the heat of the lamp 90 will cause rocking of the element 96 the lamp will also serve to illuminate the element and the display moved thereby.

From the above it will be clear that the invention includes a strip of thermostatic metal and means holding said strip in curved condition whereby it will rock when its curved surface is disposed on a heated surface. An article or articles to be displayed, or other means, may be supported to be moved by the thermostatic element as the latter rocks back and forth. However, such article or means must be so supported on the element that the latter is balanced. That is, the load must be the same at each side of the center of the element as otherwise the latter will be overloaded at one end and will move toward that end and not thereafter rock back. The thermostatic element may be in one piece or more as for example it may be a two-piece construction as shown in Figs. 7 and 8 but its ends must be anchored or held whereby it is maintained in the form of a curve as shown in each instance.

While the means of the invention has been disclosed as used in connection with advertising devices, toys and the like it is to be understood that this is only for the purpose of illustration and that the device of the invention is of general application and is not claimed as limited to the uses mentioned. The thermostatic strips or elements herein referred to are all composed of the usual bimetallic thermal strips of commerce. Such material when fabricated as herein disclosed functions as herein described. The thermal elements or means of the invention while generally in the form of a single strip may be in the form of a pair of strips as in Fig. 7 and the claims unless specifically limited to either a single part element or a multi-part element are intended to include either type.

Having thus set forth the nature of our invention what we claim is:

1. A thermal device comprising a thin bimetallic thermal element curved in the direction of its length whereby it has a convex outer surface, a holding means extending about and in spaced relation to said convex surface, said holding means of less width than said element whereby a portion of the convex surface of the latter is exposed at a side of the holding means, means rigidly connecting the ends of the holding means with the ends of the element whereby to retain the latter in curved condition, and said thermal device when cold having its center of gravity below and in a radius passing through the center of curvature of the element whereby on disposing of the convex surface portion of the element on a heated surface the heat causes a characteristic distortion of the element momentarily at the point of contact with said heated surface and results in a shifting of the center of gravity of the device to one side or the other of said radial line to produce a rocking movement of the device.

2. A thermal device comprising a thin bimetallic thermal element curved in the direction of its length whereby it has a convex outer surface, rigid means extending between the ends of said element, said means including portions having slots therein into which the ends of said elements extend whereby the element is retained in curved condition, said element having its convex surface exposed beyond said rigid means whereby the element may be disposed on said surface and support said rigid means, and said thermal device when cold having its center of gravity below and in a radius passing through the center of curvature of the element whereby on disposing of the convex surface portion of the element on a heated surface the heat causes a characteristic distortion of the element momentarily at the point of contact with said heated surface and results in a shifting of the center of gravity of the device to one side or the other of said radial line to produce a rocking movement of the device.

3. A thermal device comprising a body, pairs of legs on said body, a thin bimetallic strip associated with each of said pairs of legs, said strips forming a unit with and supporting said legs and body, said strips curved outwardly in their portions between said legs to provide outer convex surfaces, means securing said strips to the legs of the respective pairs whereby to maintain said portions curved, and said thermal device when cold having its center of gravity below the centers of curvature of the strips and in a radius passing between said centers whereby on disposing of the convex surface portions of the strips on a heated surface the application of heat causes a characteristic distortion of the strips momentarily at their points of contact with said heated surface and results in a shifting of the center of gravity of the device to one side or the other of said radial line thereby producing a rocking movement of the device.

4. In combination, a heat source, a supporting surface heated from said source, a thermal device comprising a thin bimetallic thermal element curved in the direction of its length whereby it has a convex outer surface, means carried by and maintaining said element in said curved condition with said convex surface exposed, said element having its convex surface against said supporting surface and resting on the same, and said thermal device when cold having its center of gravity below and in a radius passing through the center of curvature of the curved portion of the element whereby application of heat from said heated supporting surface causes a characteristic distortion of the element momentarily at the place of contact with said heated supporting surface and results in a shifting of the center of gravity of the device to one side or the other of said radial line thereby producing a rocking motion of the device, and means guiding such motion of the device and maintaining its motion through a fixed plane.

5. In combination, a heat source, a supporting surface heated from said source, a thermal device comprising a thin bimetallic thermal element curved in the direction of its length whereby it has a convex outer surface, means carried by and maintaining said element in said curved condition with said convex surface exposed, said element having its convex outer surface against said heated supporting surface and resting on the same, said thermal device when cold having its center of gravity in a radius passing through the center of curvature of the curved portion of the element whereby application of heat from said heated supporting surface causes a characteristic distortion of the element momentarily at the place of contact with said heated supporting surface and results in a shifting of the center of gravity of the device to one side or the other of said radial line thereby producing a rocking motion of the device, and positive stop means limiting the amplitude of such rocking motion of the thermal device.

6. In combination, a heat source, a supporting surface heated from said source, a thermal device comprising a thin bimetallic thermal element curved in the direction of its length whereby it has a convex outer surface, means carried by and maintaining said element in said curved condition with said convex surface exposed, said element having its convex outer surface against said heated supporting surface and resting on the same, said thermal device when cold having its center of gravity below and in a radius passing through the center of curvature of the curved portion of the element whereby application of heat from said heated supporting surface causes a characteristic distortion of the element momentarily at the place of contact with said heated supporting surface and results in a shifting of the center of gravity of the device to one side or the other of said radial line thereby producing a rocking motion of the device, and means preventing lateral tipping of said thermal device during such rocking motion.

7. In combination, a heat source, a supporting surface heated from said source, a thermal device comprising a thin bimetallic thermal element curved in the direction of its length whereby it has a convex outer surface, means carried by and maintaining said element in said curved condition with said convex surface exposed, said element having its convex outer surface against said heated surface and resting on the same, said thermal device when cold having its center of gravity in a radius passing through the center of curvature of the curved portion of the element whereby application of heat from said heated supporting surface causes a characteristic distortion of the element momentarily at the place of contact with said heated supporting surface and results in a shifting of the center of gravity of the device to one side or the other of said radial line thereby producing a rocking motion of the device, and means securing a portion of said element against said heated supporting surface whereby to positively limit the amplitude of such rocking motion and to prevent lateral tipping of the device.

8. In combination, a heat source, a supporting surface heated from said source, a thermal device comprising a thin bimetallic thermal element curved in the direction of its length whereby it has a convex outer surface, means carried by and maintaining said element in said curved condition with said convex surface exposed, said element having its convex outer surface against said heated surface and resting on the same, said thermal device when cold having its center of gravity in a radius passing through the center of curvature of the curved portion of the element whereby application of heat from said heated supporting surface causes a characteristic distortion of the element momentarily at the place of contact with said heated supporting surface and results in a shifting of the center of gravity of the device to one side or the other of said radial line thereby producing a rocking motion of the device, and positive stop means limiting the amplitude of such rocking motion of the device and maintaining such motion through a fixed plane.

9. In combination, a heat source, a supporting surface heated from said source, a thermal device comprising a thin bimetallic thermal element curved in the direction of its length whereby it has a convex outer surface, means carried by and maintaining said element in said curved condition with said convex surface exposed, said element having its convex outer surface against said heated surface and resting on the same, said thermal device when cold having its center of gravity in a radius passing through the center of curvature of the curved portion of the element whereby application of heat from said heated supporting surface causes a characteristic distortion of the element momentarily at the place of contact with said heated supporting surface and results in a shifting of the center of gravity of the device to one side or the other of said radial line thereby producing a rocking motion of the device, positive stop means limiting the amplitude of such rocking motion of said thermal device and maintaining its motion through a fixed plane, and said last means including a slot and a guide means interposed between the thermal element and said heated surface.

10. In combination, a heat source, a supporting surface heated from said source, a thermal device comprising a thin bimetallic thermal element curved in the direction of its length whereby it has a convex outer surface, means carried by and maintaining said element in said curved condition with said convex surface exposed, said element having its convex outer surface against said heated surface and resting on the same, said thermal device when cold having its center of gravity in a radius passing through the center of curvature of the curved portion of said element whereby application of heat from said heated supporting surface causes a characteristic distortion of the element momentarily at the place of contact with said heated supporting surface and results in a shifting of the center of gravity of the device to one side or the other of said radial line thereby producing a rocking motiton of the device, and positive stop means passing through the mid-portion of said element and securing its convex surface against said heated surface.

11. In an article of manufacture, a bracket having a pair of angularly related arms of which one is adapted to be secured to a lamp socket with the other disposed over a lamp in said socket, a thermal device comprising a bimetallic thermal element curved in the direction of its length whereby it has an outer convex surface, means carried by and securing the ends of said element in fixed relation whereby it is held in curved condition, positive stop means passing through the mid-section of the curved portion of the element and securing it to said other arm of the bracket with its mid-section against said arm, said thermal device when cold having its center of gravity in a radius passing through the center of curvature of the curved portion of the element whereby on heating of said other arm of the bracket by said bulb the heat causes a characteristic distortion of the element at the place of contact with the heated other bracket arm and results in a shifting of the center of gravity of the device to one side or the other of said radial line thereby producing a rocking motion of the device.

LEWIS A. WHITNEY.
AUSTIN C. KIDDER.